United States Patent
Bedo

(10) Patent No.: US 12,245,343 B2
(45) Date of Patent: Mar. 4, 2025

(54) LUMINAIRE DRIVER SYSTEM WITH SPD

(71) Applicant: Schreder S.A., Brussels (BE)

(72) Inventor: Peter Balázs Bedo, Budapest (HU)

(73) Assignee: Schreder S.A., Brussels (BE)

( * ) Notice: Subject to any disclaimer, the term of this patent is extended or adjusted under 35 U.S.C. 154(b) by 82 days.

(21) Appl. No.: 17/421,882

(22) PCT Filed: Jan. 9, 2020

(86) PCT No.: PCT/EP2020/050420
§ 371 (c)(1),
(2) Date: Jul. 9, 2021

(87) PCT Pub. No.: WO2020/144273
PCT Pub. Date: Jul. 16, 2020

(65) Prior Publication Data
US 2024/0032174 A1   Jan. 25, 2024

(30) Foreign Application Priority Data
Jan. 9, 2019 (NL) ................................ 2022358

(51) Int. Cl.
*H05B 45/50* (2022.01)
(52) U.S. Cl.
CPC .................................. *H05B 45/50* (2020.01)
(58) Field of Classification Search
None
See application file for complete search history.

(56) References Cited

U.S. PATENT DOCUMENTS

| 6,188,557 B1 * | 2/2001 | Chaudhry | ............... H04M 3/18 |
| | | | 361/111 |
| 9,049,753 B1 | 6/2015 | Wassel et al. | |
| 2010/0127625 A1 * | 5/2010 | Minarczyk | ........... H05B 41/292 |
| | | | 315/119 |

(Continued)

FOREIGN PATENT DOCUMENTS

WO   2013008152 A1   7/2013

OTHER PUBLICATIONS

PCT International Search Report and Written Opinion, Application No. PCT/EP2020/050420, mailed Feb. 13, 2020, 13 pages.

*Primary Examiner* — Anh Q Tran
(74) *Attorney, Agent, or Firm* — McDonnell Boehnen Hulbert & Berghoff LLP

(57) ABSTRACT

A luminaire driver system comprising: a driver (200) having a driver housing (250) with output connections (202) for connection to at least one light source (110); wherein the driver comprises a driver circuitry (210) arranged in said driver housing, said driver circuitry being configured to perform a driving functionality of the at least one light source (110); wherein said driver housing is provided with a receiving means (260) for receiving a pluggable surge protection module (300); the surge protection module (300) comprising surge protection circuitry (310), wherein the surge protection module and/or the receiving means are configured such that the surge protection circuitry is connectable to a power supply and such that the surge protection circuitry is electrically connected to the driver circuitry, when the surge protection module is received in the receiving means.

20 Claims, 7 Drawing Sheets

(56) References Cited

U.S. PATENT DOCUMENTS

| | | | |
|---|---|---|---|
| 2015/0257229 A1* | 9/2015 | Wassel | H05B 47/19 |
| | | | 315/307 |
| 2016/0286635 A1 | 9/2016 | Lestician | |
| 2017/0245341 A1* | 8/2017 | Lee | H05B 47/20 |

* cited by examiner

LUMINAIRE DRIVER SYSTEM WITH SPD

CROSS-REFERENCE TO RELATED APPLICATIONS

The present application is a national stage entry of PCT/EP2020/050420 filed Jan. 9, 2020, which claims priority to NL 2022358 filed Jan. 9, 2019, the contents of each of which are hereby incorporated by reference.

FIELD OF INVENTION

The invention relates to a luminaire driver system, in particular a luminaire driver system with a driver for driving at least one light source and a surge protection device, and to a luminaire comprising such a luminaire driver system.

BACKGROUND

Luminaire systems, in particular outdoor luminaire systems, comprise a luminaire housing in which a support with at least one light source is arranged. Typically, the at least one light source comprises a plurality of light-emitting diodes (LEDs). For example, a luminaire system may comprise a luminaire pole and a luminaire head formed by the luminaire housing. In other luminaire systems, the luminaire head may be connected to a wall. A driver for the at least one light source, typically in the form of a LED driver, may be arranged in or on the luminaire head, in or on the luminaire pole, or in any other suitable location of the luminaire system.

In order to leverage the benefit of long life of the at least one light source, typically a plurality of LEDs, the luminaire system is typically designed to be robust under lighting surge events. Surge protection devices (SPDs) are provided to absorb energy and protect the driver, typically including a LED driver circuit. An SPD can fail under certain conditions (e.g., a surge event with excessive voltage). Prior art solution use SPDs with surge protection circuitry and monitoring circuitry configured to monitor a malfunctioning of the surge protection circuitry. The surge protection device is provided with two output pins for connection to a warning LED to provide an indication of the malfunctioning of the surge protection circuitry. Upon SPD failure a user or operator may be warned so that a failed SPD can be replaced in a timely manner.

SUMMARY

The object of embodiments of the present invention is to provide an improved luminaire driver system with a driver and surge protection circuitry, which is more compact and more flexible in terms of replacement of the surge protection circuitry and/or installation.

According to a first aspect of the invention there is provided a luminaire driver system comprising a driver and a pluggable surge protection module. The driver has a driver housing with output connections for connection to at least one light source. The driver comprises a driver circuitry arranged in the driver housing. The driver circuitry is configured to perform a driving functionality of the at least one light source. The driver housing is provided with a receiving means configured for receiving the pluggable surge protection module, such that the pluggable module can be received from outside of the driver housing. The surge protection module comprises surge protection circuitry. The surge protection module and/or the receiving means are configured such that the surge protection circuitry is connectable to a power supply and such that the surge protection circuitry is electrically connected to the driver circuitry, when the surge protection module is received in the receiving means.

According to an exemplary embodiment, the surge protection module is provided with at least two power input terminals (L, N) for connection to a power supply, and optionally with a ground or equipotential terminal (GND). When only a protection against differential surges is required, the ground or equipotential terminal (GND) is not needed. Such an embodiment has the advantage that power can be provided directly to the surge protection module, and that the driver housing does not need to be provided with power input terminals. In other words, the surge protection module can be plugged in the driver, and the power supply can be connected directly to the surge protection module via the at least two power input terminals provided to a housing of the surge protection module. Thus the power supply does not need to be connected to the driver itself.

In a preferred embodiment, the receiving means is provided with a connection interface connecting the driver circuitry via the surge protection circuitry to the at least two power input terminals when the surge protection module is plugged in the receiving means. Preferably, the connection interface and the surge protection module are configured such that the receiving means can either receive a power connection plug for connecting the driver circuitry to a power supply, or a surge protection module according to embodiment described in the previous paragraph, wherein the surge protection module is configured to receive the power connection plug. In that manner the driver can be used without surge protection module and connected via the connection interface to the power supply, or with a surge protection module which has its own power input terminals for connection to the power supply. Thus the driver can be compact and flexible at the same time.

According to another exemplary embodiment, the driver housing is provided with at least two power input terminals (L, N) for connection to a power supply, and optionally with a ground or equipotential terminal (GND), and the surge protection circuitry is electrically connected via internal connections in the driver housing to the at least two power input terminals and optionally to the ground or equipotential terminal (GND). Such an embodiment has the advantage that the surge protection module does not need to have power input terminals (L, N) which makes the replacement of a surge protection module even more convenient.

According to another exemplary embodiment, the surge protection module comprises monitoring circuitry configured to monitor a malfunctioning of the surge protection circuitry and to provide an output signal based on said monitoring. The surge protection module may be provided with at least one output terminal for outputting the output signal and/or the driver may be provided with at least one output terminal for outputting the output signal. In that manner, the output signal can be used by the luminaire system to communicate the malfunctioning to a user or operator. The communicating of the malfunctioning can be done in any suitable way, e.g. using an indicator device, a display, a transmissions means, etc. In some embodiments, there may be provided only one output terminal, but in other embodiments there may be provided two or more output terminals. For example, the output signal may be a voltage signal present between two output terminals.

The surge protection circuitry and monitoring circuitry may be configured to provide the output signal automatically or on request, e.g. on request of maintenance personnel. In other words, a push mechanism and/or a pull mechanism may be used to signal the malfunctioning. For example, upon request, the indicator device may emit a green light if the surge protection circuitry is OK or a red light if the surge protection circuitry is broken.

According to another exemplary embodiment, the driver or surge protection module is provided with an equipotential connecting part available at an external surface of the driver or surge protection module, respectively, and intended for being connected to an equipotential part of the luminaire; and the driver or the surge protection module further comprises a resistive circuitry arranged inside the driver or the surge protection module, respectively, and connected between the equipotential connecting part and a power input terminal of the driver or of the surge protection module.

When using such a surge protection module or driver, the equipotential connecting part thereof can be connected to the equipotential part of the luminaire, such that a resistive electrical path is created between the equipotential part of the luminaire and a power input terminal through the resistive circuitry. The power input terminal can be connected to the neutral line of the electrical distribution grid. The resistive circuitry present between the equipotential part and the power input terminal allows a small current (an intentional leakage current) to flow from the equipotential part of the luminaire to the neutral line of the electrical distribution grid. Thus, when electrostatic charges accumulate on the equipotential part of the luminaire, those charges can leak towards the earth through the neutral line thanks to the resistive circuitry. By including such resistive circuitry in the driver or surge protection module, the risk of accumulating electrostatic charge to a critical level so that an electrostatic discharge (ESD) can happen through an insulation layer and damage semiconductor components such as LEDs, is reduced, without the need for a separate connection of the luminaire housing and/or heat sink to the earth. The luminaire housing and/or the heat sink may be simply connected, directly or indirectly, to the equipotential connecting part during installation of the driver and surge protection module. For example, the equipotential connecting part may be connected directly to an electrically conductive portion of the luminaire housing and/or of the heat sink.

Preferably, the resistive circuitry is connected between the equipotential connecting part and a power input terminal (N) of the at least two power input terminals (L, N).

Preferably, the resistive circuitry has an equivalent resistance value which is between 1 Mega Ohm and 100 Mega Ohm, preferably between 1.5 Mega Ohm and 10 Mega Ohm. The resistive circuitry may comprise one or more resistive components. The one or more resistive components may be one or more resistors but may also include one or more other resistive components such as semiconductor components. The resistive circuitry is chosen such that the amount of electrostatic charges on the equipotential part of the luminaire cannot increase too rapidly. Values in the above mentioned range are suitable for achieving this goal. Typically, the equivalent resistance value has to be low enough to prevent electrostatic charge accumulation above a critical level (as explained above), while being high enough to prevent electrical safety concerns related to the bridging of an insulation barrier between the electrical distribution grid and the accessible equipotential part of the luminaire. If the driver housing is made of an electrically non-conductive material, e.g. plastic, the insulation barrier may comprise the electrically non-conductive material of the driver housing. Additionally or alternatively, the insulation barrier may comprise an insulation sheet arranged around the driver circuitry. Preferably, the resistive circuitry has an equivalent resistance value in the above mentioned range within a predetermined frequency range, wherein the predetermined frequency range may be from 0 Hz to 100 kHz, or even from 0 Hz to 1 GHz. In other words, the resistive circuitry may provide a high electrical resistivity over a frequency range from direct current to high frequency alternative current or transient.

Preferably the resistive circuitry comprises at least one resistor. More preferably, the resistive circuitry comprises at least two resistors connected in series in a branch between the equipotential connecting part and the power input terminal.

Preferably, the resistive circuitry is configured such that a safe failure mode is secured. For example, the resistive circuitry may be configured such that an open circuit is created when the resistive circuitry breaks down. For security reasons such types of resistive circuitry are preferred.

In an exemplary embodiment, the driver housing or the surge protection module further contains a switching element and a control means for controlling the switching element, wherein the switching element is connected in series with the resistive circuitry, between the equipotential connecting part and the power input terminal. In that manner, the resistive circuitry may be "activated" by the control means as needed, e.g. the resistive circuitry may be "activated" only when it is known that there is a risk of electrostatic discharge and there is no electrical path to earth. The control means may be configured to receive an external control signal, e.g. a wireless or wired signal, and to control the opening and closing of the switching element accordingly.

According to a further developed embodiment, the driver housing or the surge protection module further contains a branch with a second resistive circuitry and a second switching element connected in series with the second resistive circuitry, wherein the branch is connected between the equipotential connecting part and the power input terminal. The control means is then further configured to control the second switching element. The second resistive circuitry may have an equivalent resistance value which is different from the equivalent resistance value of the first resistive circuitry. In that manner, using the switching elements, it may be decided to use either the first resistive circuitry, or the second resistive circuitry, or the first and second resistive circuitry connected in parallel. Depending on the properties of the luminaire system and/or the environment, the first and second switching element may be controlled to set a suitable resistance.

In an exemplary embodiment, the driver or surge protection module further comprises a capacitor arranged inside the driver housing or inside the surge protection module and connected to the equipotential connecting part. Such capacitor may result in a driver with surge protection module which fulfills typical electromagnetic compatibility (EMC) requirements.

In an exemplary embodiment, the driver housing or the housing of the surge protection module is at least partially made of metal, and the equipotential connecting part is formed by the metal of the driver housing or surge protection module. In other possible embodiments the housing of the driver or surge protection module may be made of an electrically insulating material such as plastic, and the equipotential connecting part may be integrated in the housing of the driver or surge protection module. For example, the equipotential connecting part may be any one of the following: a connection wire, a connector plug, a connector pin, a connector socket, a terminal block, etc. Such equipotential connecting parts allow for a convenient connection to the equipotential part of the luminaire.

The invention also relates to a luminaire system comprising a support with at least one light source and a luminaire driver system according to any one of the embodiments described above.

The luminaire system may comprise an indicator device, and the monitoring circuitry may be connected such that a state of the indicator device is changed when the output signal indicates a malfunctioning. Preferably such indicator device is arranged on the same support as the at least one light source. By including the indicator device on the same support as the support for the at least one light source of the luminaire system, a simple and robust solution is provided with a limited cost. More in particular, adding an indicator device such as a LED to the support containing the at least one light source can be easily achieved and does not entail other modifications to the luminaire system. Also, the indicator device could be another visible light source (e.g. laser, UV, IR, a flash light, etc.). In other embodiments, the indicator device may be included at a different location. In that regard, reference is made to the co-pending application NL2022357 in the name of the applicant, which is included herein by reference.

Preferably, the monitoring circuitry is connected such that the output signal is provided to at least one of:
  the indicator device such that a state of said indicator device is changed when the output signal indicates a malfunctioning,
  the driver circuitry, wherein the driver circuitry comprises converter circuitry configured to convert an AC voltage in a DC drive current for driving the indicator device, such that a state of the indicator device is changed when the output signal indicates a malfunctioning,
  a control means configured for controlling the driver circuitry based on said output signal, wherein the driver circuitry is configured to drive the indicator device such that a state of said indicator device is changed when the output signal indicates a malfunctioning.

In other words the output signal may be provided directly to the indicator device or via the driver circuitry or via control means. When the output signal is provided directly to the indicator device, the monitoring circuit may be configured to provide, as an output signal, a current or voltage having a level which is suitable to power the indicator device when a malfunction is detected, whilst the level is not adapted to power the indicator device when the surge protection module operates normally, or vice versa. In another embodiment, the driver circuitry may be configured to drive the indicator device, based on the received output signal. As the driver circuitry also has to drive the at least one light source, such a solution may be advantageous in terms of required connections. More in particular, the receiving means may be provided with one or more connectors for receiving the output signal from the surge protection module, when plugged in. In yet another embodiment, the luminaire system comprises a control means configured for controlling the driver circuitry, and the output signal is provided to the control means. Such control means may then also control the driver circuitry in order to control the powering of the indicator device such that the indicator device indicates a malfunctioning when the output signal indicates a malfunctioning.

According to an exemplary embodiment, the indicator device comprises at least one LED. The at least one LED may comprise at least one LED configured to emit red light. This is advantageous in the sense that red is a generally accepted color to indicate a malfunctioning, and in that it can be easily distinguished from the color of the at least one light source which is usually a warm or cold white. However, the at least one indicator LED may also be configured to emit another color, e.g. green or blue. Also, the indicator device could be a flash light. In yet another embodiment, a transparent or translucent cover is arranged over the at least one light source and the at least one indicator LED, and a small portion of the transparent or translucent cover is provided in a color, such that this colored portion lights up when the at least one indicator LED is activated. In another embodiment, an optical element (optionally part of an optical plate) is arranged over the at least one indicator LED, and the optical element is provided in a color.

According to an exemplary embodiment the luminaire system comprises a transmission means. The monitoring circuitry may be connected such that the output signal can be provided to the transmission means and the transmission means is configured for transmitting a malfunction message to a remote device based on the output signal. By providing the possibility to send malfunction messages to a remote device, an appropriate action can be taken to replace the surge protection module.

The remote device may be any device remote from the luminaire system, e.g. a remote server, a mobile device (such as a smartphone, tablet or laptop), another luminaire system, etc. The transmission may be done using a long-distance communication protocol or using a short-distance communication protocol. For example, the transmission may be done through a cellular network or may be done through a mesh network. In a possible embodiment, the transmission is done using a short-distance communication protocol and the malfunction message is sent to a nearby other luminaire system. This nearby other luminaire system may then be configured with a transmission means configured to communicate the message using a long-distance communication protocol to another remote device, e.g. a remote server and/or a mobile device. In another possible embodiment, the transmission by the transmissions means is done directly to a remote device, such as a mobile device or a remote server, using a long-distance communication protocol. The transmission to a nearby mobile device may also be done using a short-distance communication protocol.

The short-distance or short-range protocol may be an IEEE 802.15.4-based protocol, such as a Zigbee. It may also be any one of the following: 6LoWPAN, Bluetooth, Z-wave, BLE, WiFi, NFC (Near Field Communication), Sigfox, etc. The long-distance or long-range protocol may be any cellular network standard, and more in particular any 1G, 2G, 3G, 4G or 5G cellular network standard, e.g. GSM, GPRS, LTE, etc. However, also other long-distance protocols may be used such as Ethernet or LoraWan.

According to an exemplary embodiment, the transmission means and the driver circuitry are included in the driver housing. However, in other embodiments, the transmission means may be included in a separate controller, e.g. a controller connected to a luminaire housing through a socket such as a NEMA or Zhaga socket.

According to an exemplary embodiment, the malfunction message may be automatically sent, e.g. when the output signal indicates a malfunctioning. For example, a message could be automatically sent at specific moments in time (e.g. when the luminaire is switched on) with an indication on whether the surge protection circuitry is still working or not. Alternatively or in addition, the transmission means may be configured to receive a request for information about the functioning of the surge protection circuitry from a remote device, and to send in response a malfunction message comprising an indication whether or not there is a malfunctioning of the surge protection circuitry based on the output signal to the remote device. In other words, a push mechanism and/or a pull mechanism may be used to transmit the malfunction message to a remote device.

According to an exemplary embodiment, the luminaire system further comprises a display. The monitoring circuitry may be connected such that a message is indicated on the display, e.g. when the output signal indicates a malfunctioning. For example, a message could be automatically displayed at specific moments in time (e.g. when the luminaire is switched on) with an indication on whether the surge protection circuitry is still working or not. Such an embodiment will in particular be advantageous when a display is present in the luminaire system for other purposes. For example, a display could be present to provide passersby with information, such as environmental information, advertisements, information about the area, etc. Such a display may be provided to any component of the luminaire system. For example, the display may be integrated in, positioned in, or provided to a luminaire pole of the luminaire system, a component such as a cabinet, attached to the luminaire pole or located adjacent the luminaire pole, a luminaire head, a luminaire module, etc.

The message may be e.g. a symbol, a color, a text message, an image, etc.

According to an exemplary embodiment, the monitoring circuitry is connected such that the output signal is provided to at least one of:
- the display such that said display can indicate a malfunctioning when the output signal indicates a malfunctioning,
- a control means configured for controlling the display based on said output signal,
- the driver circuitry, wherein the driver circuitry is configured for driving and controlling the display based on the output signal.

In other words the output signal may be provided directly to the display or via the driver circuitry or via control means. In a possible embodiment, the luminaire system comprises a control means configured for controlling the display, and the output signal is provided to the control means. Such control means may then also control the image data to be displayed such that the display indicates a malfunction message, e.g. when the output signal indicates a malfunctioning.

It is noted that the various embodiments described above may be combined. For example, a luminaire system with an indicator device and/or display may further comprise a transmission means configured for transmitting a malfunction message to a remote device based on the output signal.

According to an exemplary embodiment, the support is a PCB. In that way the at least one light source and optionally the indicator device can be easily connected with the driver, and thus also with the surge protection module.

According to a preferred embodiment, the at least one light source comprises at least one LED, preferably a plurality of LEDs.

According to an exemplary embodiment, the driver circuitry is configured to convert an AC voltage in a DC drive current for the at least one light source. Such converter circuitry is preferred when the at least one light source comprises light emitting diodes. In that manner, a plurality of light emitting diodes connected in series can be easily provided with a drive current. However, in alternative embodiments, a voltage-to-voltage converter may be used. More generally, depending on the type of light source, the drive means may be any suitable drive means to drive the light source.

According to an exemplary embodiment, the surge protection circuitry comprises at least one metal oxide varistor (MOV) and/or at least one thermal protection device such as a thermal fuse and/or a gas discharge tube (GDT).

In a preferred embodiment a thermal fuse and a MOV are connected in series between two power terminals of the surge protection module. The MOV clamps the voltage between the power terminals to a predetermined maximum voltage that is selected to be within the limits required by the driver. The thermal fuse will open when the temperature caused by an excess current exceeds a predetermined threshold. In that way the MOV is protected from high currents. The threshold may be selected to open the thermal fuse before the heat generated is so high as to cause failure of the MOV that could damage other components of the driver.

In a possible embodiment the GDT is connected between a ground or equipotential terminal and at least one of the at least two power terminals. The GDT creates an effective short circuit when triggered, so that if any electrical energy is present on the at least one terminal, the GDT will form a short-circuit. Once triggered, the GDT will continue conducting until all electric current sufficiently diminishes, and the gas discharge quenches.

According to an exemplary embodiment, the monitoring circuitry comprises a first monitoring line on one side of the MOV and a second monitoring line of the other side of the MOV. For example, the first monitoring line is connected directly or indirectly to a first terminal of the MOV and a second monitoring line is connected directly or indirectly to a second terminal of the MOV.

The monitoring circuitry may consist only of one or more monitoring lines without any active electrical components. The presence of monitoring circuitry in the surge protection module implies that there is at least one output terminal connected to at least one monitoring line.

According to an exemplary embodiment, the monitoring circuitry comprises a galvanic isolation configured to isolate a connection to the surge protection circuitry from the at least one output terminal.

In an exemplary embodiment, the driver circuitry comprises a rectifier circuitry and a power switching converter circuitry, wherein the power switching converter circuitry is arranged downstream of the rectifier circuitry when looking from the power supply towards the at least one light source. Preferably the power switching converter circuitry comprises a galvanic insulation between a primary side and a secondary side thereof. The power switching converter circuitry may comprise e.g. a flyback converter, a buck converter, a boost converter, etc.

According to an exemplary embodiment, the driver housing may be provided with a further externally accessible receiving means configured for receiving a pluggable module comprising a further circuit. The further circuit may comprise circuitry allowing the luminaire driver to communicate using one or more protocols such as Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), Bluetooth, Bluetooth Low Energy (BLE), an analog communication protocol such as an analog 4-20 mA current loop protocol used for electronic signaling. The further circuit may be part of the transmission means described above.

Optionally, the receiving means is such that the further circuit is connected to driver circuitry when the pluggable module is plugged in the receiving means. Optionally the driver housing may be provided with at least one, preferably externally accessible, control input and/or output connector element connected to the further circuit of the pluggable module, when the pluggable module is plugged in the receiving means. The at least one externally accessible control input and/or output connector element may then be used to receive and/or send at least one further input and/or output signal using said one or more protocols. It is also possible to use a wireless protocol, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN). In such an embodiment the control input and/or output connector element may be omitted.

BRIEF DESCRIPTION OF THE FIGURES

The accompanying drawings are used to illustrate presently preferred non-limiting exemplary embodiments of luminaire drivers and systems of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
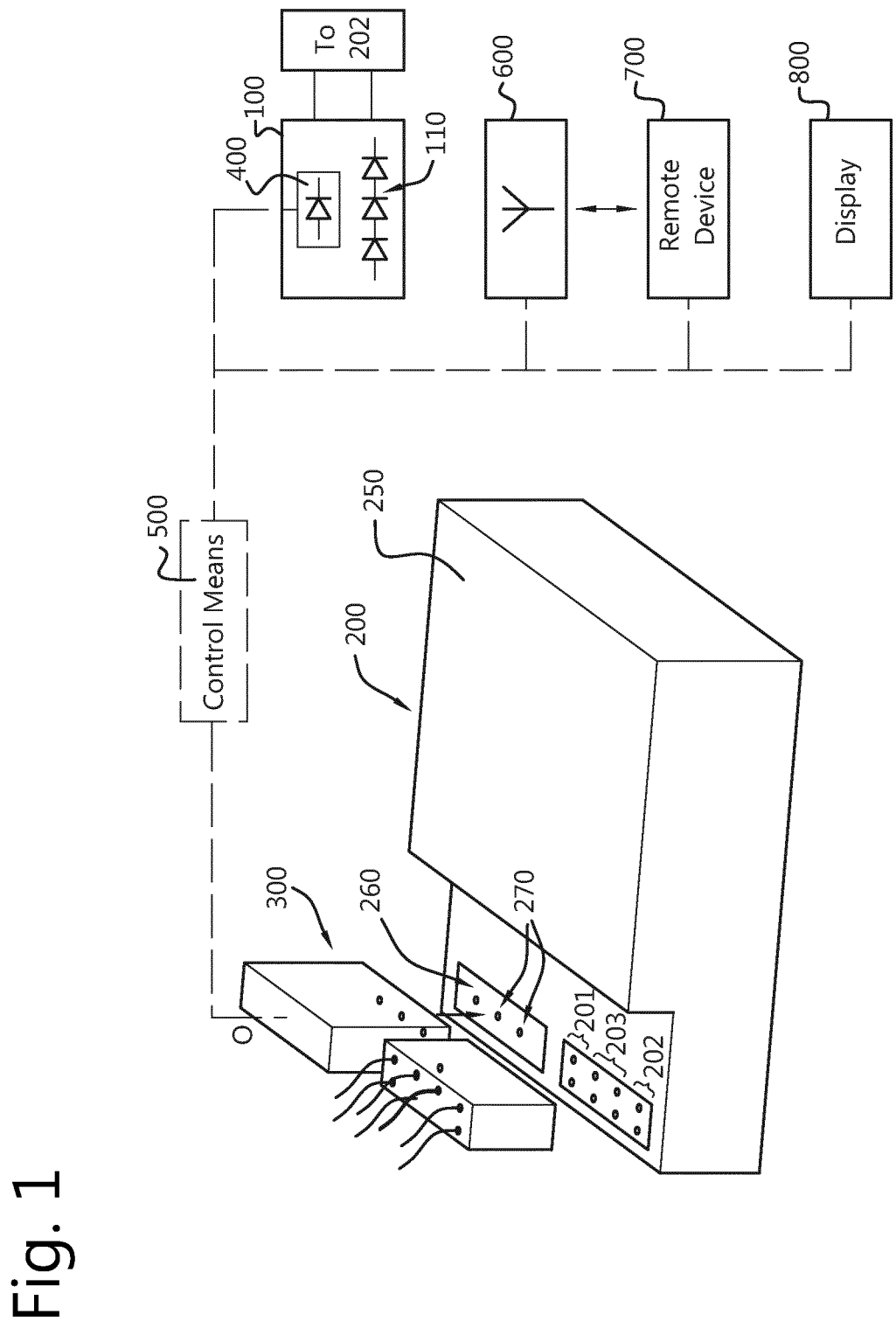
FIG. 1 is a schematic view of an exemplary embodiment of a luminaire system of the invention.
Figure 2:
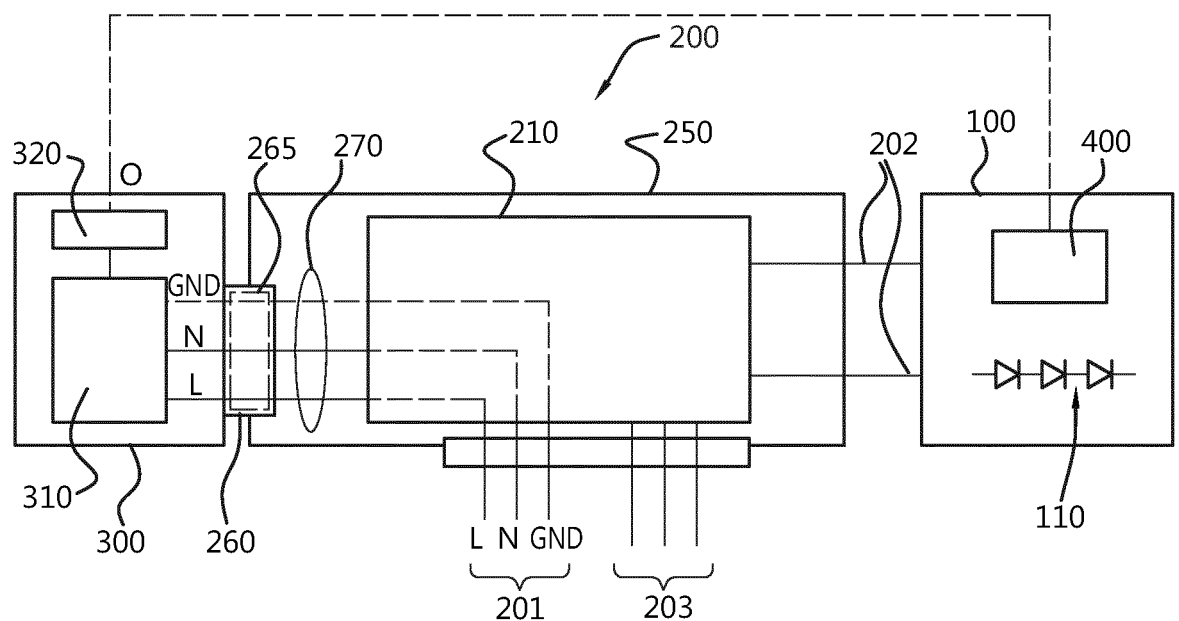
FIG. 2 is a schematic view of an exemplary embodiment of a luminaire system similar to the embodiment of FIG. 1.

FIGS. 1 and 2 illustrate a first exemplary embodiment of a luminaire system comprising a luminaire driver system with a driver 200 and a surge protection module 300. The driver 200 has a driver housing 250 with output connections 202 for connection to at least one light source 110. The driver 200 comprises a driver circuitry 210 arranged in the driver housing 250, see FIG. 2. The driver circuitry 210 is configured to perform a driving functionality of the at least one light source 110. The said driver housing 250 is provided with a receiving means 260 configured for receiving the pluggable surge protection module 300, such that the pluggable surge protection module 300 can be received from outside of the driver housing 250. The surge protection module 300 comprises surge protection circuitry 310 and may optionally comprise monitoring circuitry 320 configured to monitor a malfunctioning of the surge protection circuitry 310. However, embodiments of the invention also cover pluggable surge protection modules without monitoring circuitry 320.

The surge protection module 300 and the receiving means 260 are configured such that the surge protection circuitry 310 is connected to a power supply and such that the surge protection circuitry 310 is connected to the driver circuitry 210, when the surge protection module 300 is received in the receiving means 260. This is shown in FIG. 2. The driver housing 250 is provided with at least two power input terminals 201 for connection to a power supply, and the surge protection circuitry 310 is electrically connected via internal connections 270 in the driver housing 250 to the at least two power input terminals 201. In FIG. 2 the at least two power input terminals comprise a terminal for connection to a neutral line N of an electrical distribution grid, and a terminal for connection to a voltage line L of an electrical distribution grid. Optionally, also a ground or equipotential terminal GND may be provided.

The luminaire system further comprises a support 100, typically a PCB, with the at least one light source 110 arranged thereon, and optionally an indicator device 400. Typically, the at least one light source 110 comprise a plurality of LEDs connected in series and/or in parallel. The indicator device 400 may also be arranged on the support 100, i.e. on the same support as the support on which the at least one light source 110 is arranged, but could also be arranged at a different location.

The driver 200 may be arranged in or on a luminaire head, in or on the luminaire pole, or in any other suitable location of the luminaire system. The pluggable surge protection module 300 is provided in order to leverage the benefit of long life of the at least one light source 110, typically a plurality of LEDs. The surge protection module 300 protects the driver 200 against surge events. The driver 200, and in particular the driver circuitry 210 may be configured to convert an AC voltage in a DC drive current for the at least one light source 110.

Figure 7:
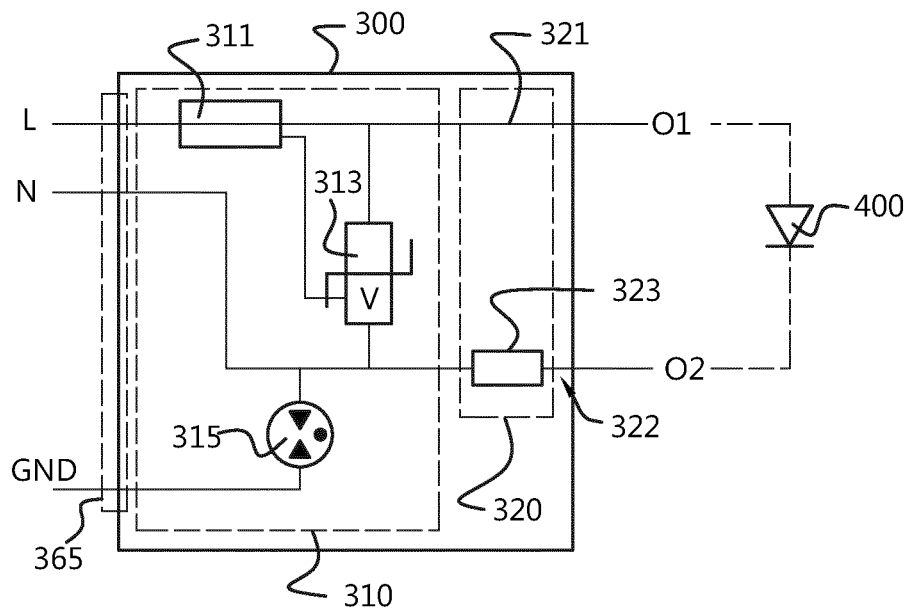
FIGS. 7-10 are circuit diagrams illustrating exemplary embodiments of a surge protection module for use in luminaire systems of the invention.
Figure 10:
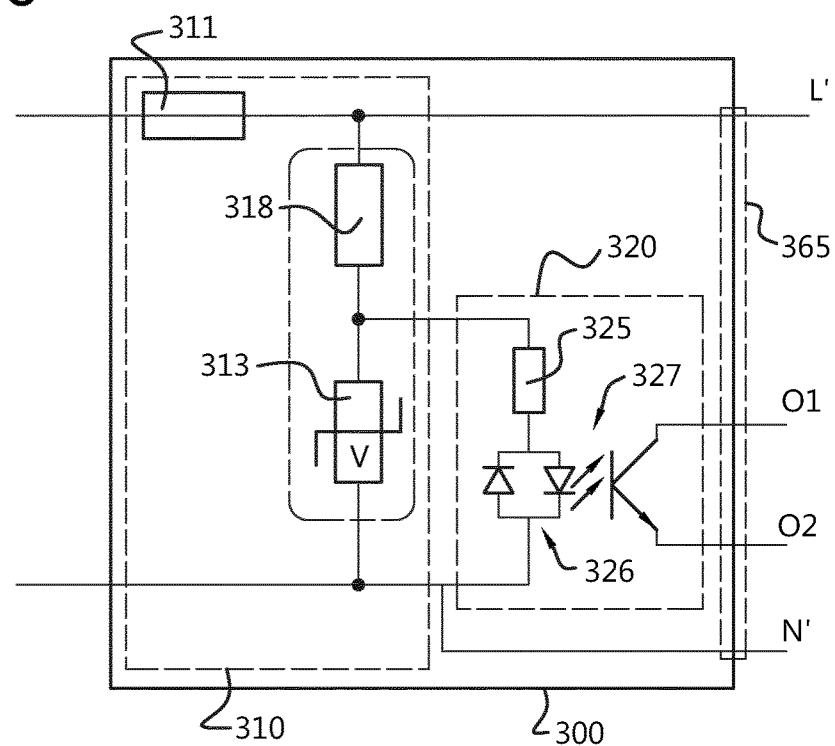

The optional monitoring circuitry 320 is configured to monitor a malfunctioning of the surge protection circuitry 310 and to provide an output signal based on said monitoring. In FIGS. 1 and 2 only one output terminal O for the output signal is shown, but the output signal may also be a voltage signal provided between two output terminals O1 and O2 as shown in FIG. 7 or 10. The monitoring circuitry 320 may be connected such that said indicator device 400 is activated or deactivated when the output signal indicates a malfunctioning. In the embodiment of FIG. 2 the monitoring circuitry 320 is connected such that the output signal is provided to the indicator device 400, such that the indicator device 400 is activated or deactivated when the output signal indicates a malfunctioning. For example, as shown in FIG. 7 or 10, the monitoring circuit 320 may be configured to provide, as an output signal, a voltage having a level which is suitable to power or not to power the indicator device 400 depending on the output signal. It is noted that a powered device may either indicate a correct functioning or may indicate a malfunctioning, depending on what is agreed upon. For example, a powered red light may indicate a malfunctioning, whilst a powered green light may indicated a normal functioning of the surge protection circuitry.

The indicator device 400 may comprise at least one LED. The indicator device may be configured to emit red light to indicate a malfunctioning, and so that it can be easily distinguished from the color of the at least one light source 110 which is usually a warm or cold white. However, the at least one indicator LED may also be configured to emit another color, e.g. green or blue. Also, the indicator device could be a flash light and/or a visible light source other than LED (e.g. laser, UV, IR, etc.). In a possible embodiment, the support 100 is part of a luminaire head and a transparent or translucent cover (not shown) is arranged over the at least one light source 110. For example, the at least one transparent or translucent cover may form a portion of the luminaire housing in which the support 100 is arranged. The at least one indicator LED 400 may also emit through the cover. Optionally a small portion of the transparent or translucent cover is provided in a color, such that this colored portion lights up when the at least one indicator LED 400 is activated. In another embodiment, an optical element (e.g. a portion of an optical plate) is arranged over the at least one indicator LED, and the optical element is provided in a color.

Figure 4:
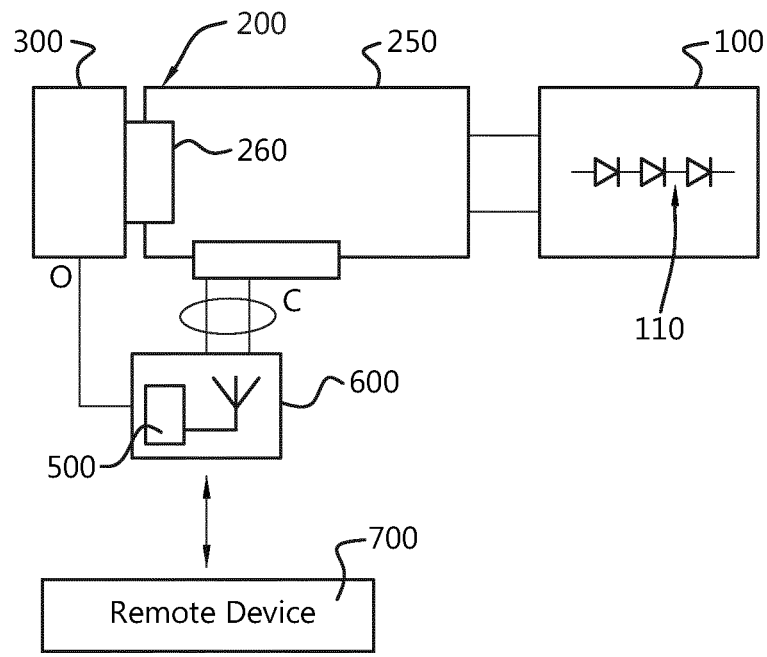
FIGS. 4 and 5 illustrate schematically two further exemplary embodiments of a luminaire system with transmission means.

As shown in FIG. 1 and FIG. 4, the luminaire system may further comprise a control means 500 and/or a transmission means 600 and/or a display 800. The monitoring circuitry 320 may be connected such that the output signal is provided to the control means 500 and the control means 500 may be configured for controlling the transmission means 600 and/or the display 800 based on the output signal. The control means 500 may be provided in a controller separate from the driver 200, e.g. a controller connected to a luminaire housing through a socket such as a NEMA or Zhaga socket. Optionally, the transmission means 600 and the control means 500 may be provided in a single component, as illustrated in FIG. 4. Optionally, the control means 500 may be configured to control the driver 200 through control lines C as illustrated in FIG. 4. Also, the control means 500 may comprise different control portions, e.g. a first portion for controlling the transmission means 600, and a second portion for controlling the display 800. Optionally the first portion may be integrated with the transmission means 600. Optionally the second portion may be integrated with the display 800.

The transmission means 600 is configured for transmitting a malfunction message to a remote device 700 based on the output signal. By transmitting malfunction messages to a remote device, an appropriate action can be taken to replace the surge protection module 300. The transmission means 600 may comprise an antenna. The remote device 700 may be any device remote from the luminaire system, e.g. a remote server, a mobile device (such as a smartphone, tablet or laptop), another luminaire system, etc. The transmission by the transmission means 600 may be done using a long-distance communication protocol or using a short-distance communication protocol. For example, the transmission may be done through a cellular network or may be done through a mesh network. In a possible embodiment, the transmission by the transmission means 600 is done using a short-distance communication protocol and the malfunction message is sent to a nearby other luminaire system. This nearby other luminaire system may then be configured with a transmission means configured to communicate the message using a long-distance communication protocol to another remote device, e.g. a remote server and/or a mobile device. In another possible embodiment, the transmission by the transmission means 600 is done directly to a remote device, such as a mobile device or a remote server, using a long-distance communication protocol. The transmission to a nearby mobile device may also be done using a short-distance communication protocol, such as Bluetooth.

The transmission means 600 may be included in the driver housing 250. However, in other embodiments, the transmission means 600 may be included in a separate controller, e.g. a controller connected to a luminaire housing through a socket such as a NEMA or Zhaga socket.

The malfunction message may be automatically sent by the transmission means 600, e.g. when the output signal indicates a malfunctioning. Alternatively or in addition, the transmission means 600 may be configured to receive a request for information about the functioning of the surge protection module 300 from a remote device 700, and to send in response a malfunction message comprising an indication whether or not there is a malfunctioning of the surge protection module 300 based on the output signal to the remote device. In other words, a push mechanism and/or a pull mechanism may be used to transmit the malfunction message from the transmission means 600 to a remote device 700.

The display 800 may be present in the luminaire system for other purposes. For example, the main purpose of the display 800 could be to display information, such as environmental information, advertisements, information about the area, etc. The display 800 may be provided to any component of the luminaire system. For example, the display 800 may be integrated in, positioned in, or provided to a luminaire pole of the luminaire system, a component such as a cabinet associated with the luminaire, e.g. attached to the luminaire pole or located adjacent the luminaire pole, a luminaire head, a luminaire module, e.g. a module of a modular luminaire comprising a plurality of modules arranged one above the other, etc. The display 800 may be a touch-screen device. The display 800 may be configured to display certain information automatically or upon request. For example, the display 800 may display a main menu allowing a user to select the information to be displayed on the display 800.

The message which is displayed on the display 800 for indicating the malfunctioning of the surge protection circuitry 310 may be e.g. a symbol, a color, a text message, an image etc. The message may be displayed automatically when the output signal indicates a malfunctioning, or it may be displayed upon request, e.g. when an operator requests to display the status of the surge protection module 300. Also here, a push mechanism and/or a pull mechanism may be used for displaying the malfunction message on the display 800.

Figure 3:
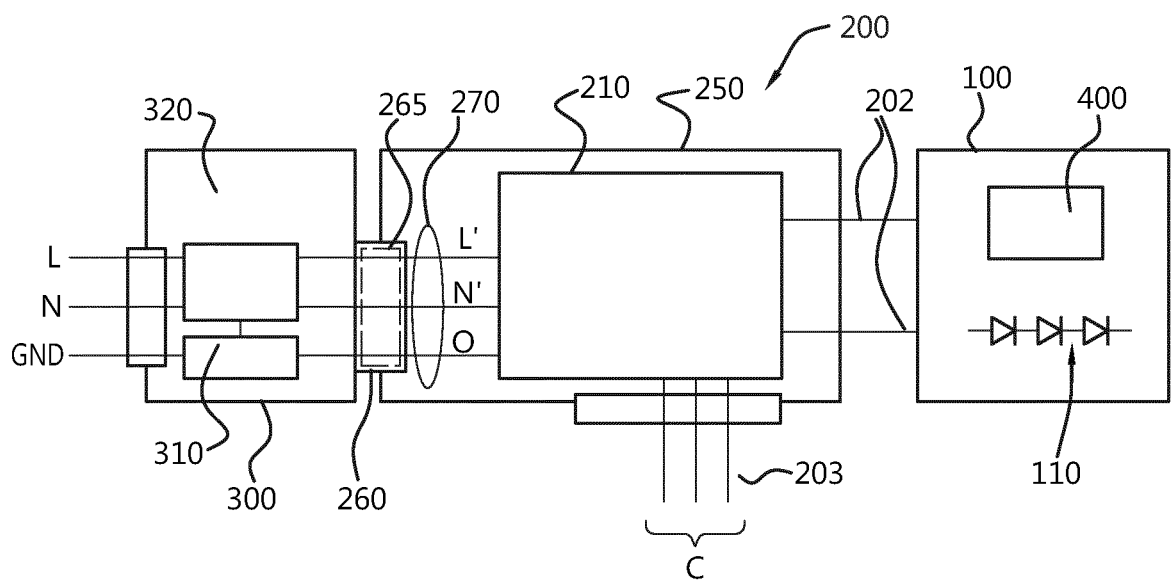
FIG. 3 is a schematic view of another exemplary embodiment of a luminaire system.

FIG. 3 illustrates another embodiment of a luminaire driver system with a driver 200 and a surge protection module 300. The surge protection module 300 is provided with at least two power input terminals L, N for connection to a power supply, and optionally a ground or equipotential terminal GND. The receiving means 260 is provided with a connection interface 265 in order to connect the driver circuitry 210 with the power supply through the surge protection module 300. The connection interface 265 comprises terminals L', N' to realize the connection with the terminals L, N, through the surge protection circuitry 310. For example, the surge protection circuitry 310 may be implemented as illustrated in any one of the FIGS. 8-12. Preferably the receiving means 260 is configured to receive either a power connection plug (not shown) for connecting the driver 200 directly to a power supply, or to receive the surge protection module 300. In that manner, the driver 200 can be used without surge protection module 300 and connected via the connection interface 265 of the receiving means 260 to the power supply, or with a surge protection module 300 which has its own power input terminals L, N for connection to the power supply. Thus the driver can be compact and flexible at the same time. In such an embodiment, the surge protection module 300 may be configured to receive the power supply plug, see also FIG. 12. Thus the receiving means 260 of the driver 200 may be similar to receiving means in the surge protection module for receiving the power supply plug.

In the embodiment of FIG. 2, the surge protection module 300 is provided with at least one output terminal O for outputting the output signal, which output terminal O might be externally accessible. In the embodiment of FIG. 3 the output terminal O is connected to a connection interface 265 of the receiving means 260 of the driver 200, such that the output signal is provided to the driver 200. Optionally, the driver 200 may be provided with at least one output terminal for outputting the output signal (not shown in FIG. 2, but this could be one of the control terminals 203 of the driver, see also FIG. 5).

The monitoring circuitry 320 may be connected to the driver circuitry 310 through the connection interface 265 of the receiving means 260 such that the driver circuitry 210 drives an indicator device 400 based on the output signal at the output terminal O. The driver circuitry 210 may be configured to drive the indicator device 400 such that said indicator device is activated or deactivated when the output signal indicates a malfunctioning. Such a solution may be advantageous in terms of required connections.

Figure 5:
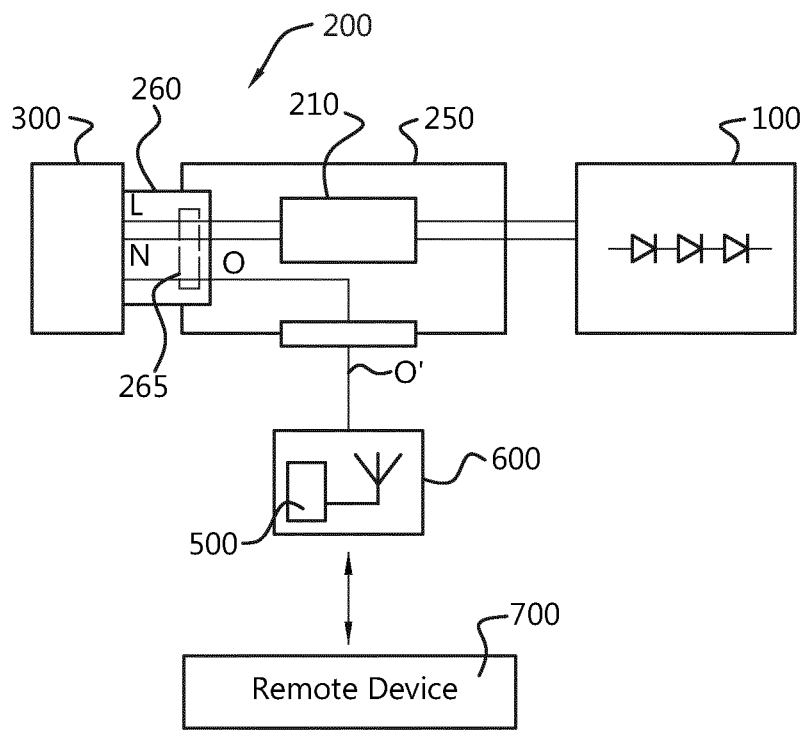

FIG. 5 is similar to the embodiment of FIG. 4 which has been described above, with this difference that the output terminal O is connected to the connection interface 265 of the receiving means 260 of the driver 200, and the driver 200 is provided with a control output terminal O' for outputting the output signal or a signal based thereon to the control means 500, such that the transmission means 600 may send a message to a remote device 700 to indicate the malfunctioning of the surge protection module 300.

Figure 6:
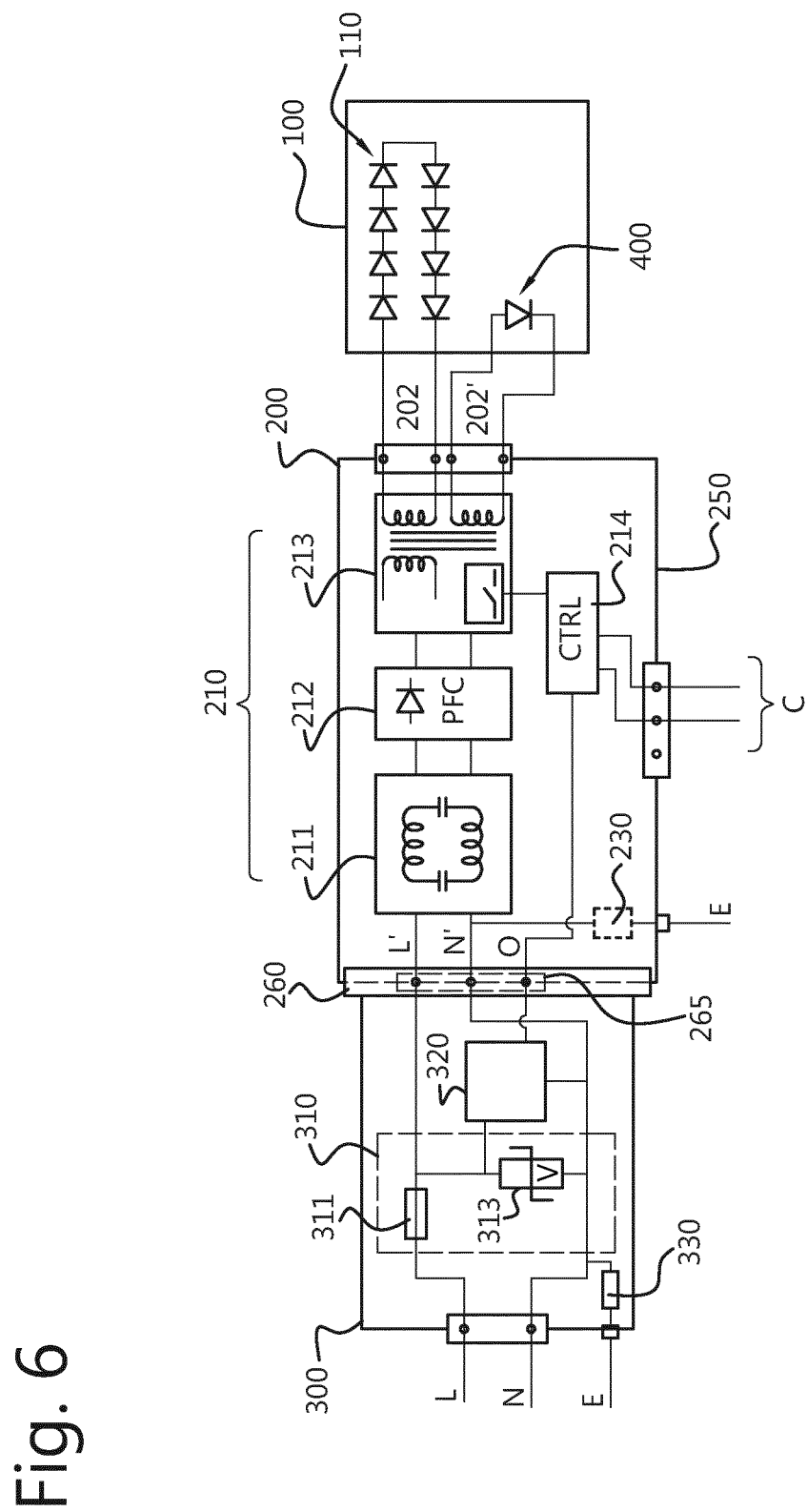
FIG. 6 is a circuit diagram illustrating in more detail possible surge protection circuitry and driver circuitry.

FIG. 6 illustrates in more detail possible driver circuitry 210 of the driver 200 and possible surge protection circuitry 310 of the surge protection module 300.

The driver 200 typically includes a galvanic insulation between the mains input circuitry (the so called 'primary circuit') and the secondary circuit including the plurality of light sources 110. Looking in a downstream direction from the power supply input connector elements L', N' towards the output connector elements 202, 202', the driver circuitry 210 typically comprises a rectifier and smoothing circuitry 211, a power factor correction circuitry 212, and an isolated power switching converter circuitry 213. The rectifier and smoothing circuitry 211 may include one or more components, such as diodes, transistors, capacitors, and/or resistors, arranged to rectify and/or filter the voltage between the first and second power supply input connector elements L', N'. The rectifier circuitry may include e.g. a passive diode bridge rectifier. The rectifier circuitry may further include one or more components arranged to smoothen and/or otherwise condition the rectified DC voltage. The power factor correction circuitry 212 may include a passive component such as inductor and capacitor. It might also include an active component such as transistor or integrated circuit. The isolated power switching converter circuitry 213 includes a transformer with at least one primary side winding and at least one secondary side winding, preferably with a galvanic insulation between the primary side and the secondary side. The isolated power switching converter circuitry 213 may comprise e.g. a flyback converter, a buck converter, a boost converter, etc. The converter circuitry is configured to drive the at least one light source 110, but may also be configured to drive one or more other components of the luminaire system. The converter circuitry 213 may comprise voltage-to-current converter circuitry configured for generating a drive current for the at least one light source 110, as well as other converter circuitry configured for generating a drive current or voltage suitable for driving the one or more other components, e.g. an indicator device 400, a sensor, a camera, a controller, etc. In the illustrated embodiment of FIG. 6, the converter circuitry 213 also drives the indicator device 400 via the output connector elements 202'. Optionally the driver circuitry 210 may further comprise dimming circuitry configured to be controlled in function of a dimming control signal which may be received in a wireless or wired manner from a control means arranged inside or outside of the driver housing 250, and/or possibly even at a remote location.

The driver circuitry 210 may also comprise control circuitry 214 configured for controlling the converter circuitry 213, and in particular one or more switching elements of the converter circuitry 214, in function of a control signal received through a control connector element C. The control signal may be a light control signal, e.g. a dimming control signal, such as a measured light intensity. The duty cycle and/or the frequency of the switching of the switching element may then be controlled in function of the received control signal to adjust the light emitted by the at least one light source 110. Additional control connector elements may be provided in order to input or output other control signals. The control connector elements may be integrated in the driver housing 250 and may be accessible from outside of the driver housing 250.

The light source 110 comprises a plurality of light emitting diodes. Typically, an insulation layer (not shown) electrically insulates the so-called 'secondary circuit' including the light source 110 and other non-illustrated electrical components, from an electrically conductive equipotential part of a housing of the luminaire. This insulation layer may be formed by a layer of a PCB on which the plurality of light emitting diodes is mounted and/or by an additional layer inserted between the luminaire housing and the PCB. The driver 200 typically includes a galvanic insulation 213 between the so called 'primary circuit' 211, 212 and the secondary circuit including the light source 110. Optionally, this galvanic insulation 213 may be bridged over by one or more capacitors (not shown) for EMC purposes. The driver 200 may be arranged in the luminaire housing or on the luminaire housing, on or in a luminaire pole, or in any other location near the luminaire.

The surge protection module 300 or the driver housing 250 may be provided with an equipotential connecting part E which is available at an external surface of the surge protection module 300 or driver housing 250, respectively, so that an operator can easily connect the equipotential connecting part E to an electrically conductive equipotential part of a luminaire housing. The equipotential connecting part E may also be called a functional earth connecting part. The driver 200 may comprise an insulation barrier between the primary circuit and the equipotential connecting part E. If the driver housing 250 is made of an electrically non-conductive material, e.g. plastic, the insulation barrier may comprise the electrically non-conductive material of the driver housing 250. If the driver housing 250 is made of an electrically conductive material, the insulation barrier may comprise an insulation sheet arranged around the driver circuitry. The surge protection module 300 or the driver 200 further comprises a resistive circuitry 330 or 230 arranged inside the surge protection module 300 or inside the driver housing 250, respectively, and connected between the equipotential connecting part E and the power input terminal N, bridging the insulation barrier. The resistive circuitry 230 or 330 is connected such that a resistive path is formed between the equipotential connector part E and the power input terminal N.

By including the resistive circuitry 230 or 330 and connecting the equipotential part E to the electrically conductive equipotential part of the luminaire housing, charges accumulating on the electrically conductive equipotential part of the luminaire housing can leak through the resistive circuitry 230 or 330 located between the equipotential part of the luminaire housing and the neutral line N, so that the risk of accumulation of charges over the insulation layer (e.g. a layer of the PCB) is cancelled or reduced. The resistive circuitry 230 or 330 may have any one of the properties described above in the summary. The resistive circuitry 230 or 330 may be included in any one of the other embodiments described above and below in a similar manner.

Optionally, for EMC purposes, a capacitor (not shown) may be arranged inside the surge protection module 300 or inside the driver housing 250. The capacitor may be connected between the equipotential connecting part E and the power input terminal N or N'. Similarly, a capacitor may be connected between the equipotential connecting part E and the power input terminal L or L'.

The surge protection module 300 comprises surge protection circuitry 310 and optionally monitoring circuitry 320. The surge protection circuitry 310 may comprise a thermal fuse 311 and a metal oxide varistor (MOV) 313. The thermal fuse 311 and the MOV 313 are connected in series between the terminal L and the terminal N. The operation of the thermal fuse 311 and the MOV 313 will be explained in more detail below with reference to FIGS. 7-10.

FIGS. 7-10 illustrate exemplary embodiments of a surge protection module 300 for use in luminaire systems of the invention.

FIG. 7 illustrates a surge protection module 300 comprising surge protection circuitry 310 and monitoring circuitry 320. The surge protection circuitry 310 comprises a thermal fuse 311, a metal oxide varistor (MOV) 313, and a gas discharge tube (GDT) 315. The thermal fuse 311 and the MOV 313 are connected in series between the terminal L and the terminal N. The gas tube 315 is connected between terminal N and the GND terminal. The MOV 313 is configured to absorb energy from an excess voltage caused by a voltage surge. The MOV 313 clamps the voltage between the terminals L, N to a predetermined maximum voltage that is selected to be within the limits required by the drive circuitry. The thermal fuse 311 will open when the temperature caused by an excess current exceeds a predetermined threshold. In that way the MOV 313 is protected from high currents. The threshold may be selected to open the thermal fuse 311 before the heat generated is so high as to cause failure of the MOV 313 that could damage other components of the drive circuitry. GDT 315 creates an effective short circuit when triggered, so that if any electrical energy (spike, signal, or power) is present on terminal N, the GDT 315 will short this. Once triggered, a GDT 315 will continue conducting until all electric current sufficiently diminishes, and the gas discharge quenches.

The monitoring circuitry 320 comprises a line 321 connecting an intermediate node between the thermal fuse 311 and the MOV 313 to an output terminal O1. The monitoring circuitry 320 further comprises a line 322 with a resistor 323 connecting terminal N to a second output terminal O2. When an indicator LED 400 is connected between O1 and O2 it will be on in normal operation and it will be off when the surge protection module 300 fails.

The terminals L, N, GND may be part of a connection interface 365 of the surge protection module 300, wherein the connection interface 365 of the surge protection module 300 is connected to the connection interface of the receiving means of the driver 200, as in FIG. 2. The terminals O1, O2 may also be part of this connection interface 365 of the surge protection module 300, or may be externally accessible terminals of the surge protection module 300.

Figure 8:
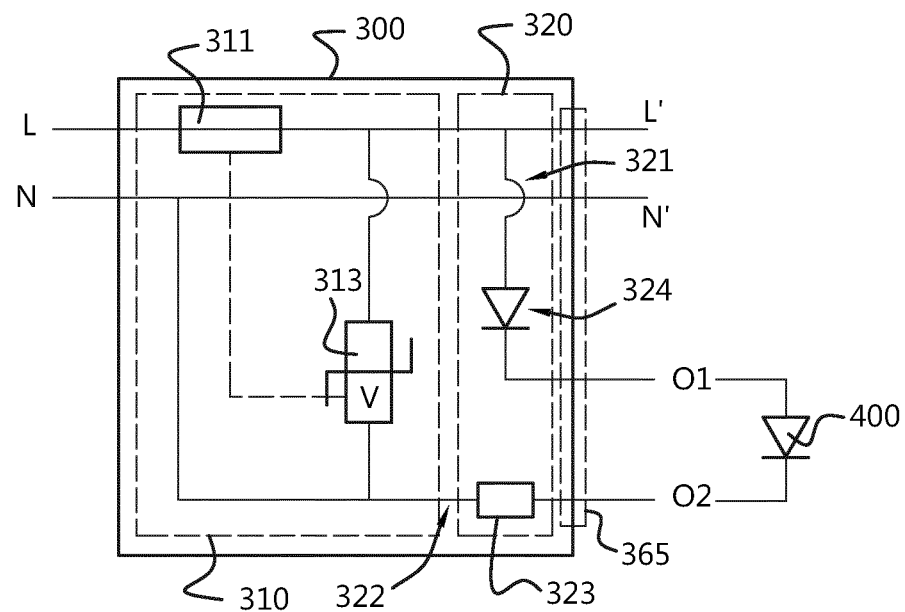

FIG. 8 illustrates an embodiment which is similar to the embodiment of FIG. 7 with this difference that the surge protection module 300 is intended for being connected in series and that it does not comprise a GDT. Further a diode 324 is included in line 321. It is noted that in a simple embodiment the monitoring circuitry 320 may comprise only the two lines 321 and 322 without resistor 323 and diode 324.

Figure 9:
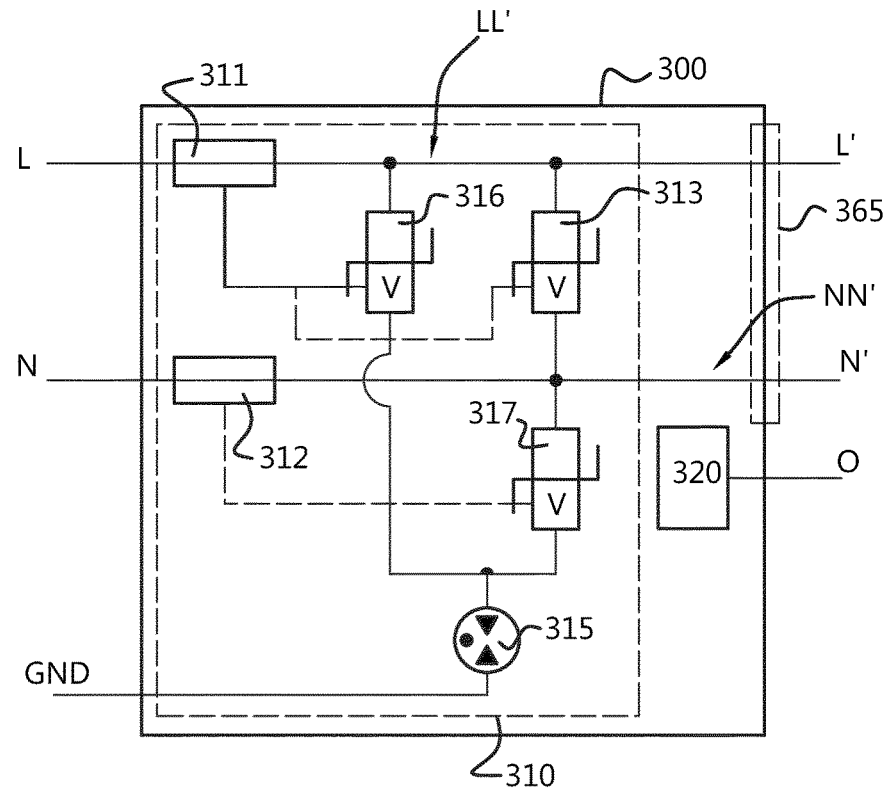

FIG. 9 illustrates a further developed embodiment of a surge protection module 300 comprising surge protection circuitry 310 and monitoring circuitry 320. The surge protection circuitry 310 comprises two thermal fuses 311, 312 three MOVs 313, 316, 317 and a GDT 315. The thermal fuses 311, 312 and the MOV 313 are connected in series between the terminal L and the terminal N with a first thermal fuse 311 being included in a first line LL' between terminal L and L', and a second thermal fuse 312 being included in a second line NN' between terminal N and N' and with MOV 313 being included between the first and second line, downstream of the thermal fuse 311 and upstream of thermal fuse 312. A series connection of MOV 316 and GDT 315 is connected between the first line LL' (downstream of thermal fuse 311) and the GND terminal. Further a series connection of MOV 317 and GDT 315 is present between the second line NN' (downstream of thermal fuse 312) and the GND terminal. By including in the surge protection module 300 both a thermal fuse 311 connected to terminal L and a thermal fuse 312 connected to terminal N, and by providing three MOVs 313, 316, 317, both differential surges as well as common mode surges can be dealt with efficiently.

FIG. 10 illustrates yet another exemplary embodiment of a surge protection module 300 comprising surge protection circuitry 310 and monitoring circuitry 320. The surge protection circuitry 310 comprises two thermal fuses 311, 318 and a MOV 313. The thermal fuses 311, 318 and the MOV 313 are connected in series between the terminal L and the terminal N with a first thermal fuse 311 being included in a first line LL' between terminal L and L', and a second thermal fuse 318 being connected in series with MOV 313 between the first line LL', downstream of the thermal fuse 311, and terminal N. The second thermal fuse 318 and MOV 313 may be provided in an integrated manner as a thermally protected MOV. The monitoring circuitry 320 comprises a monitoring line with a series connection of a resistor 325 and two anti-parallel LEDs 326, said line being connected in parallel with MOV 313. The monitoring circuitry 320 further comprises an opto-coupler 327 with phototransistor connected to output terminals O1, O2. In that way a galvanic isolation is provided to isolate a connection to the surge protection circuitry from the output terminals O1, O2. When thermal fuse 311 or 318 breaks, the current in monitoring line is interrupted and the phototransistor of the opto-coupler 327 no longer conducts. In other words, the internal impedance seen between O1 and O2 changes from low to high upon failure.

In the embodiments of FIGS. 8-10, the terminals L', N' may be part of a connection interface 365 of the surge protection module 300, wherein the connection interface is received in the receiving means 260 of the driver 200. The terminals O1, O2 may also be part of this connection interface 365 (as shown in FIGS. 8 and 10), or may be externally accessible terminals of the surge protection module 300 (see FIG. 9). The terminals L, N are intended to be externally accessible when the surge protection module 300 is plugged in the receiving means 260.

By suitably connecting O1 and O2 of the embodiments of FIGS. 7-10 with an indicator device 400 and/or with a display 800 and/or with a driver 200 and/or with a control means 500 and/or with a transmissions means 600, a failure message or indication can be provided.

Figure 11:
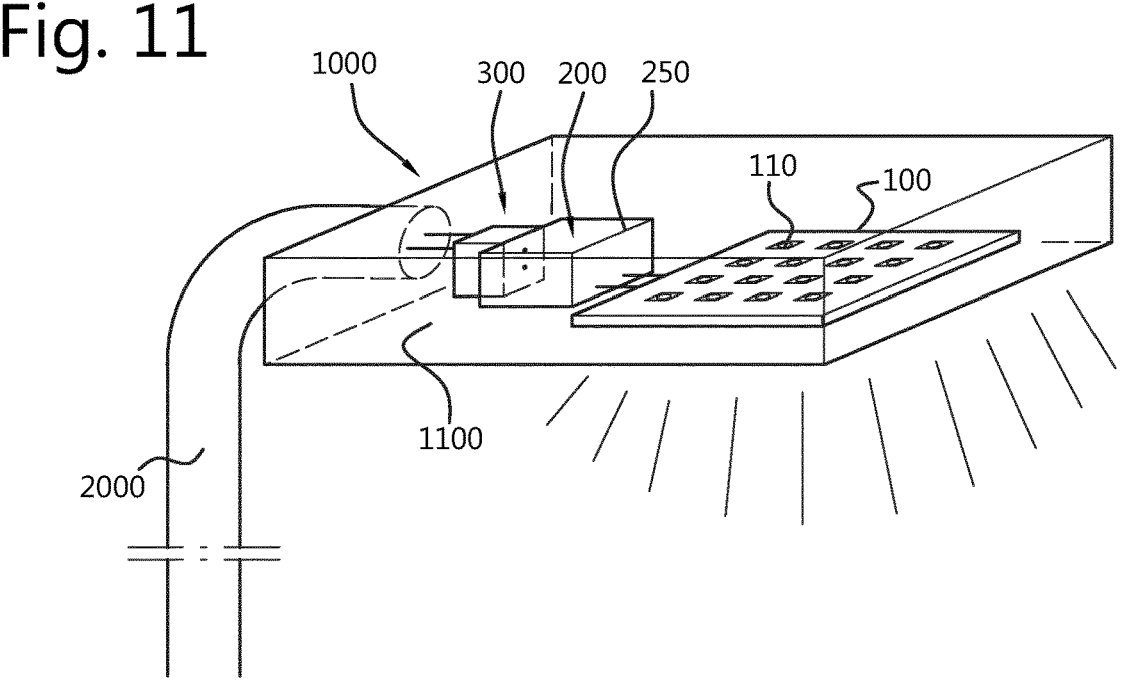
FIG. 11 is a schematic view of an exemplary embodiment of a luminaire system with a luminaire head and a pole.

FIG. 11 illustrates an exemplary embodiment of a luminaire system. The luminaire system comprises a luminaire head 1000 and a luminaire pole 2000. The luminaire head 1000 may be connected in any manner known to the skilled person to the luminaire pole 2000. In other non-illustrated embodiments, a luminaire head 1000 may be connected to a wall or a surface, e.g. for illuminating buildings or tunnels. The luminaire head 1000 comprises a luminaire housing 1100 in which a surge protection module 300, a driver 200 and a support 100 with a plurality of LEDs 110 is arranged. In another embodiment the surge protection module 300 and the driver 200 may be provided in the pole 2000 or outside of the luminaire housing 1100.

The luminaire housing 1100 may be formed as a metal casing with a transparent or translucent cover allowing light emitted by the LEDs 110 to be emitted out of the luminaire housing 1100. Optionally resistive circuitry may be provided as explained above in connection with FIG. 6, and the equipotential part (not shown, but can be either on the driver housing 250 or on the surge protection module 300 as illustrated in FIG. 6) may be connected to the electrically conductive equipotential part of the luminaire housing 1100, such that charges accumulating on the electrically conductive equipotential part of the luminaire housing 1100 can leak through the resistive circuitry located between the equipotential part of the luminaire housing 1100 and the neutral line N. In that manner, the risk of accumulation of charges over the insulation layer (e.g. a layer of the PCB) is cancelled or reduced. The resistive circuitry may have any one of the properties described above in the summary.

Figure 12:
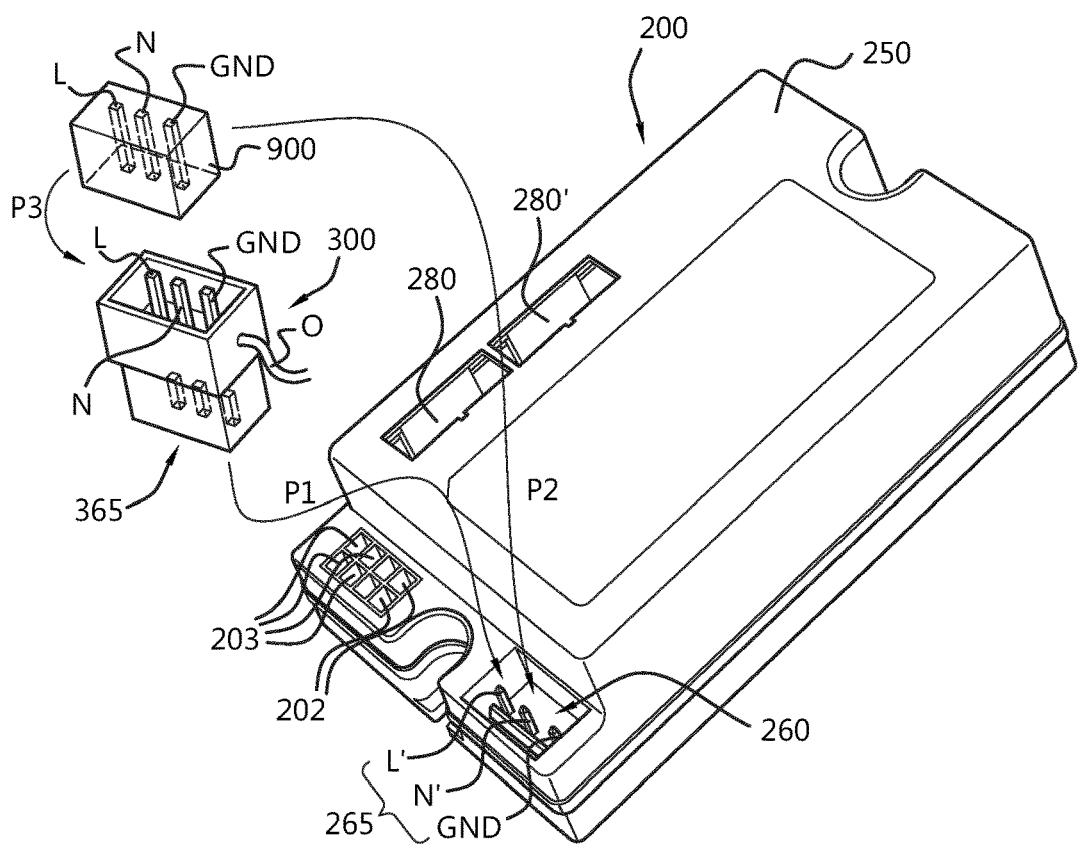
FIG. 12 is a schematic perspective view of another exemplary embodiment of a luminaire driver system of the invention.

FIG. 12 illustrates another exemplary embodiment of a luminaire driver system with a driver 200 and a surge protection module 300. The driver 200 has a driver housing 250 with output connections 202 for connection to at least one light source 110. The driver 200 comprises a driver circuitry 210 arranged in the driver housing 250. The driver circuitry 210 is configured to perform a driving functionality of the at least one light source 110, and may be configured according to any one of the embodiments disclosed above. The said driver housing 250 is provided with a receiving means 260 configured for receiving the pluggable surge protection module 300, such that the pluggable surge protection module 300 can be received from outside of the driver housing 250, see arrow P1. The surge protection module 300 comprises surge protection circuitry and may optionally comprise monitoring circuitry configured to monitor a malfunctioning of the surge protection circuitry.

The surge protection module 300 and the receiving means 260 are configured such that the surge protection circuitry is connected to a power supply and such that the surge protection circuitry is connected to the driver circuitry, when the surge protection module 300 is received in the receiving means 260. The surge protection module 300 is provided with at least two power input terminals L, N for connection to a power supply, and with an optional ground or equipotential terminal GND for connection to a ground GND. In FIG. 12 a power supply plug 900 with terminals L, N, GND is shown. This power supply plug 900 is pluggable in the surge protection module 300, see arrow P3.

A connection interface 265 (L', N', GND) of the receiving means 260 and a connection interface 365 of the surge protection module 300 are configured such that the receiving means 260 can either receive the power connection plug 900 directly, see arrow P2, or can receive the surge protection module 300, see arrow P1. In other words, the driver 200 can be used with or without surge protection module 300, in a convenient manner.

The surge protection circuitry (not shown) is electrically connected via the connection interfaces 265, 365 to internal connection lines (not shown) in the driver housing 250 to connect the driver circuitry 210 with the power supply, when the surge protection module 300 is plugged in. Optionally, the surge protection module 300 comprises monitoring circuitry configured to monitor a malfunctioning of the surge protection circuitry and to provide an output signal based on said monitoring. In FIG. 12 one output terminal O for the output signal is shown, but the output signal may also be a voltage signal provided between two output terminals O1 and O2 as shown in FIG. 7 or 10. The output terminal O may be connected as in any one of the embodiments described above.

The driver housing 250 may be provided with further externally accessible receiving means 280, 280' configured for receiving one or more further pluggable modules (not shown) comprising a further circuit, said receiving means 280, 280' being such that the further circuit is connected to the driver circuitry when the pluggable module is plugged in the receiving means 280, 280'. Also, the driver housing 250 may be provided with at least one, preferably externally accessible, connector element 203 connected to the further circuit of the further pluggable module, when the module is plugged in the further receiving means 280, 280'. Using such further pluggable module, the luminaire driver may be provided with an enhanced functionality and/or suitability for a large class of target devices in a flexible manner, whilst avoiding a significant increase of the cost and volume. Such embodiments have been described in detail in patent application PCT/EP2017/065304 filed on 21 Jun. 2017 in the name of the applicant, which is included here in its entirety by reference. It is noted that, in another non-illustrated embodiment, the receiving means 260 of the surge protection module may be similar to the receiving means 280 or 280' illustrated in FIG. 12.

Whilst the principles of the invention have been set out above in connection with specific embodiments, it is to be understood that this description is merely made by way of example and not as a limitation of the scope of protection which is determined by the appended claims.

The invention claimed is:
1. A luminaire driver system comprising:
a driver having a driver housing with output connections for connection to at least one light source, wherein the driver comprises a driver circuitry arranged in said driver housing, said driver circuitry being configured to perform a driving functionality of the at least one light source, and wherein said driver housing is provided with a receiving means configured for receiving a pluggable surge protection module, such that the plug- gable surge protection module can be received from outside of the driver housing; and the surge protection module comprising surge protection circuitry, wherein at least one of the surge protection module and the receiving means is configured such that the surge protection circuitry is connectable to a power supply and such that the surge protection circuitry is electrically connected to the driver circuitry, when the surge protection module is received in the receiving means, and wherein the surge protection module is provided with at least two power input terminals for direct connection to a power supply outside of the driver housing, such that power from the power supply is provided directly to the surge protection module, outside of the driver housing.

2. The luminaire driver system according to claim 1, wherein the surge protection module is provided with a ground or equipotential terminal, such that power from the power supply is provided directly to the surge protection module, outside of the driver housing.

3. The luminaire driver system according to claim 1, wherein the receiving means is provided with a connection interface connecting the driver circuitry via the surge protection circuitry to the at least two power input terminals when the surge protection module is plugged in the receiving means.

4. The luminaire driver system according to claim 3, wherein the connection interface and the surge protection module are configured such that the receiving means can receive the surge protection module, and wherein the surge protection module is configured to receive the power connection plug.

5. The luminaire driver system according to claim 1, wherein the surge protection circuitry comprises one or more of the following components: a metal oxide varistor, a thermal protection device such as a thermal fuse, a gas discharge tube.

6. The luminaire driver system according to claim 1, wherein the driver circuitry comprises converter circuitry configured to convert an AC voltage in a DC drive current for the at least one light source.

7. The luminaire driver system according to claim 1, wherein the surge protection module comprises monitoring circuitry configured to monitor a malfunctioning of the surge protection circuitry and to provide an output signal based on said monitoring, and wherein optionally at least one of the surge protection module and the driver housing is provided with at least one output terminal for outputting the output signal.

8. The luminaire driver system according to claim 7, further comprising a transmission means, wherein said monitoring circuitry is connected such that said output signal is provided to the transmission means and wherein the transmission means is configured for transmitting a malfunction message to a remote device based on the output signal.

9. The luminaire driver system according to claim 1 for use in a luminaire, wherein the surge protection module or the driver housing is provided with an equipotential connecting part available at an external surface of the surge protection module or the driver housing, respectively, and intended for being connected to an equipotential part of the luminaire; the surge protection module or the driver further comprising a resistive circuitry arranged inside the surge protection module or the driver housing, respectively, and connected between the equipotential connecting part and a power input terminal of the driver or of the surge protection module, wherein optionally the resistive circuitry is connected between the equipotential connecting part and a power input terminal of the at least two power input terminals, wherein preferably the surge protection module is provided with the equipotential connecting part, and wherein the surge protection module comprises the resistive circuitry.

10. The luminaire driver system according to claim 9, wherein the resistive circuitry has an equivalent resistance value which is between 1 Mega Ohm and 100 Mega Ohm, preferably between 1.5 Mega Ohm and 10 Mega Ohm, within a frequency range of 0 Hz to 100 kHz, preferably 0 Hz to 1 GHz.

11. The luminaire driver system according to claim 9, wherein the resistive circuitry comprises at least one resistor.

12. The luminaire driver according to claim 9, wherein the resistive circuitry comprises at least two resistors connected in series in a branch between the equipotential connecting part and the power input terminal.

13. A luminaire system comprising a support with at least one light source, a luminaire driver system according to claim 1 for driving said at least one light source, wherein preferably the at least one light source comprises a plurality of LEDs.

14. The luminaire system according to claim 13 comprising a luminaire driver system, wherein the surge protection module comprises a monitoring circuitry configured to monitor a malfunctioning of the surge protection circuitry and to provide an output signal based on said monitoring, further comprising an indicator device, wherein the monitoring circuitry is connected such that a state of the indicator device is changed when the output signal indicates a malfunctioning, and wherein optionally the indicator device is arranged on the support, preferably the support is a PCB.

15. The luminaire system according to claim 14, wherein the indicator device comprises at least one LED.

16. The luminaire system according to claim 14, wherein the driver circuitry comprises converter circuitry configured to convert an AC voltage in a DC drive current for the indicator device.

17. The luminaire system of claim 14, further comprising a display, wherein the monitoring circuitry is connected such that the display can display a malfunctioning message when the output signal indicates a malfunctioning.

18. A luminaire driver system comprising:
a driver having a driver housing with output connections for connection to at least one light source, wherein the driver comprises a driver circuitry arranged in said driver housing, said driver circuitry being configured to perform a driving functionality of the at least one light source, and wherein said driver housing is provided with a receiving means configured for receiving a pluggable surge protection module, such that the pluggable surge protection module can be received from outside of the driver housing; and the surge protection module comprising surge protection circuitry, wherein the driver housing is provided with at least two power input terminals for connection to a power supply, and wherein the surge protection circuitry is electrically connected via internal connections in the driver housing to the at least two power input terminals.

19. A luminaire driver system comprising:
a driver having a driver housing with output connections for connection to at least one light source, wherein the driver comprises a driver circuitry arranged in said driver housing, said driver circuitry being configured to perform a driving functionality of the at least one light source, wherein said driver housing is provided with a receiving means configured for receiving a pluggable surge protection module, such that the pluggable surge protection module can be received from outside of the driver housing; and the surge protection module comprising surge protection circuitry, wherein at least one of the surge protection module and the receiving means are configured such that the surge protection circuitry is connectable to a power supply and such that the surge protection circuitry is electrically connected to the driver circuitry, when the surge protection module is received in the receiving means, wherein the surge protection module comprises monitoring circuitry configured to monitor a malfunctioning of the surge protection circuitry and to provide an output signal based on said monitoring, and wherein at least one of the surge protection module and the driver housing is provided with at least one output terminal for outputting the output signal.

20. The luminaire driver system of claim 19, wherein the driver housing is provided with at least one output terminal for outputting the output signal.

\* \* \* \* \*